US008877861B2

(12) United States Patent
Ting et al.

(10) Patent No.: US 8,877,861 B2
(45) Date of Patent: Nov. 4, 2014

(54) ONE-POT SYNTHETIC METHOD FOR SYNTHESIZING SILVER-CONTAINING WATERBORNE POLYURETHANE

(76) Inventors: Wei-Ho Ting, Taichung (TW); Shenghong A. Dai, Taichung (TW); Tzu-Wen Kuo, Taichung (TW); Ru-Jong Jeng, Taichung (TW)

(*) Notice: Subject to any disclaimer, the term of this patent is extended or adjusted under 35 U.S.C. 154(b) by 1201 days.

(21) Appl. No.: 12/264,634

(22) Filed: Nov. 4, 2008

(65) Prior Publication Data

US 2010/0113686 A1 May 6, 2010

(51) Int. Cl.
| | |
|---|---|
| C08G 18/00 | (2006.01) |
| C08L 75/00 | (2006.01) |
| C08G 18/28 | (2006.01) |
| C08G 18/08 | (2006.01) |
| C08K 3/20 | (2006.01) |
| B32B 27/00 | (2006.01) |
| B32B 27/40 | (2006.01) |
| A01N 25/00 | (2006.01) |
| A01N 59/16 | (2006.01) |
| A61K 33/38 | (2006.01) |
| C08L 75/04 | (2006.01) |
| C08K 3/08 | (2006.01) |
| C08K 3/00 | (2006.01) |

(52) U.S. Cl.
CPC .............. *C08L 75/04* (2013.01); *C08K 3/005* (2013.01); *C08K 3/08* (2013.01)
USPC ........ 524/589; 424/405; 424/618; 428/425.9; 428/423.1; 428/425.8; 524/401; 524/500; 524/507; 524/590; 524/591

(58) Field of Classification Search
USPC ......... 524/198, 431, 500, 503, 589, 590, 401, 524/507, 591; 428/44, 45, 66, 76, 85, 428/292.1, 423.1, 425.8; 424/405, 601, 618
See application file for complete search history.

(56) References Cited

U.S. PATENT DOCUMENTS

| | | | | |
|---|---|---|---|---|
| 5,540,981 A | * | 7/1996 | Gallagher et al. | ............. 428/220 |
| 5,886,174 A | * | 3/1999 | Ripa et al. | ..................... 540/474 |
| 2007/0003603 A1 | * | 1/2007 | Karandikar et al. | .......... 424/443 |

FOREIGN PATENT DOCUMENTS

| | | | | |
|---|---|---|---|---|
| KR | 2003017218 | * | 3/2003 | ........... C09D 175/04 |
| RU | 225987 | * | 10/2005 | ............... B01J 13/00 |
| WO | WO 2006/015317 | * | 2/2006 | ............... A61F 13/00 |
| WO | WO2006120135 | * | 5/2006 | ............. A01N 59/16 |

OTHER PUBLICATIONS

Hydrazine materials—The Merck Index 1989 item 4691-2 p. 754.*
RealDictionary .com {http://www.realdictionary.com/?q=uniformly}.available May 26, 2003.*
RealDictionary {http://www.realdictionary.com/?q=disperse}—available May 26, 2003.*
ScienceLab (ScienceLab.com MSDS Oct. 10, 2005 Silver Nitrate MSDS Section 9 {http://www.sciencelab.com/msds.php?msdsId=9927411}).*

* cited by examiner

*Primary Examiner* — Patrick Ryan
*Assistant Examiner* — Aaron Greso
(74) *Attorney, Agent, or Firm* — Browdy and Neimark, PLLC

(57) ABSTRACT

The present invention relates to a one-pot synthetic method for synthesizing silver-containing waterborne polyurethane (WBPU). The method includes the steps of adding a silver ion-containing solution, such as silver nitrate solution, into WBPU emulsion to form a silver-containing PU emulsion by stirring, and dehydrating the silver-containing PU emulsion so as to obtain a WBPU containing nano-scaled silver particles having a uniform particle size and good dispersibility. The present invention provides a method that can be easily and speedily operated, and the silver-containing WBPU prepared according to the method of the present invention exhibits excellent antibacterial, bactericidal and deodorant effects but using a small amount of silver.

11 Claims, 7 Drawing Sheets

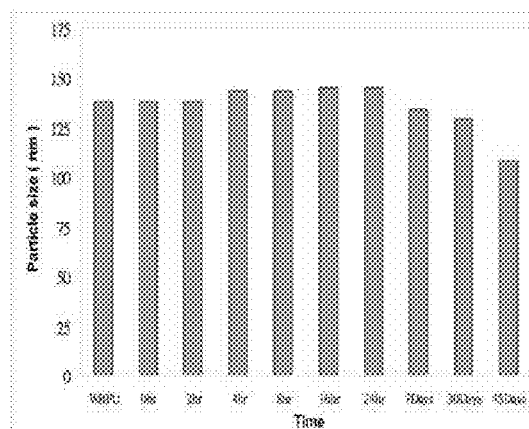 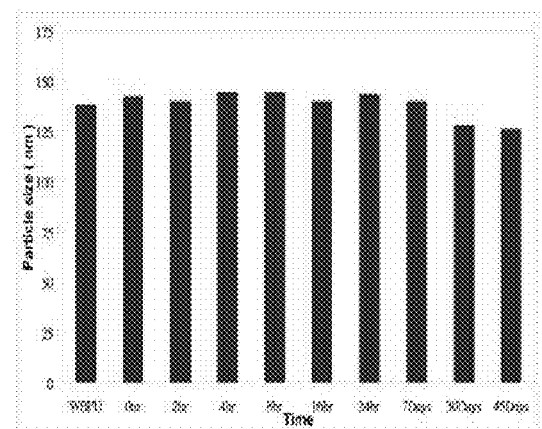
FIG. 5A  FIG. 5B
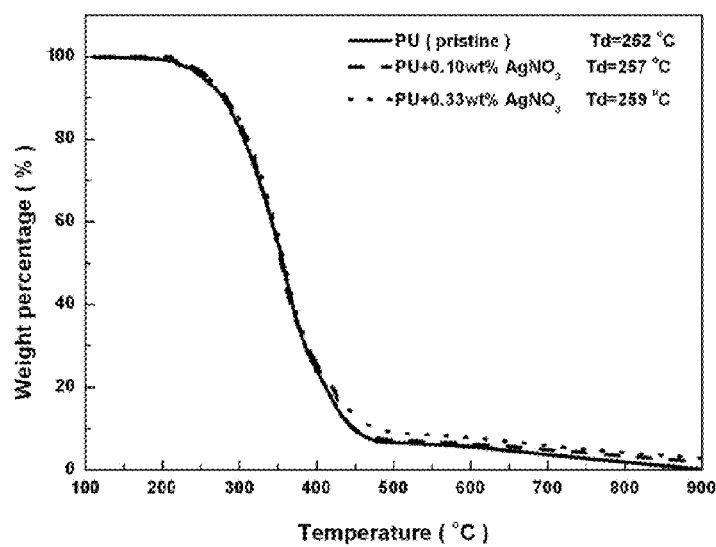
FIG. 6

ONE-POT SYNTHETIC METHOD FOR SYNTHESIZING SILVER-CONTAINING WATERBORNE POLYURETHANE

BACKGROUND OF THE INVENTION

1. Field of the Invention

The present invention relates to a method of making an antibacterial material and more particularly, to a one-pot process of synthesizing nano-scaled silver-containing waterborne polyurethane (hereinafter referred to "WBPU"). The method of the present invention can be easily and rapidly operated, and a film formed by a polyurethane emulsion prepared according to the method of the present invention contains uniform-sized and well-dispersed nanoparticles.

2. Description of the Related Art

Because of the progress of nanotechnology in the past years, making nano-scaled inorganic oxide or metallic particle has become possible. Since the increase in surface area to volume ratio makes the nano-scaled particles exhibit physical and chemical behaviors different from those of the conventional particles. The nano-scaled particles also have excellent quantum effects.

A small amount of metallic silver or silver ion is sufficient to kill bacteria by destroying the bacterial protein, such that metallic silver and silver ion have been applied to antibacterial, bactericidal, and deodorant against, especially *E. coli, staphylococcus aureus*, mold etc., all the time.

By means of the excellent film coating and forming property of polymer, polymer emulsion prepared by blending nano-scaled inorganic metal or metal oxide with polymer can be coated onto a variety substrates to form thin films. The resulting film exhibits antibacterial property even though a small amount of nano-scaled inorganic metal or metal oxide is used, thereby having economic benefit. However, inorganic metal or metal oxide can be hardly uniformly dispersed in organic polymer emulsion. Specially, the nano-scaled particles tend to flocculate together. Thus, the nano-scaled particles can not be uniformly dispersed in the resultant film formed by the polymer emulsion, resulting in color difference and mechanical property deterioration thereof.

To resolve the above-mentioned problems, several approaches have been typically used as follows: (1) surface-modifying the nano-scaled particles, so that the particles can be dispersed in the organic polymer easily; (2) mixing the nano-scaled particles with dispersing agent in advance, and then blending the mixture thus obtained with polymer, in which the dispersing agent is used as a medium; and (3) blending the nano-scaled particles with a polymer having the property of a dispersing agent, so that the nano-scaled particles can be dispersed uniformly in the polymer by utilizing the polymer chain to separate the nano-scaled particles.

However, the aforesaid approaches have many drawbacks. For example, because the nano-scaled silver particles have to be synthesized first, and then modified and dispersed in the polymer, the manufacturing process becomes complicated and time-consuming. Second, because a modifier or a dispersing agent is adsorbed on the surface of the blended nano-scaled silver particles, the properties of the blended nano-scaled silver particles are less effective and the mechanical and thermal properties of the blended polymer may be also affected. Thirdly, because a modifier is adsorbed on the surface of the surface-modified nano-scaled silver particles, the effective weight of the surface-modified nano-scaled silver particles cannot be easily measured. Fourthly, the modified nano-scaled silver ion particles or nano-scaled silver particles with dispersing agent still can not be completely uniformly dispersed. Fifthly, the sizes of commercially available nano-scaled silver particles are uneven in size at present.

FIG. 1 shows a transmission electron microscopy image of commercial available nano-scaled silver particles. It can be seen from FIG. 1 that the sizes of the nano-scaled silver particles are uneven, in which the maximum particle size is about 50 nm and the minimum particle size is about 10 nm. FIG. 2 shows a transmission electron microscopy image of silver-containing WBPU obtained by mixing the commercially available nano-scaled silver particles with the WBPU emulsion thoroughly. As shown in FIG. 2, the nano-scaled silver particles are not uniformly dispersed in the silver-containing WBPU.

SUMMARY OF THE INVENTION

An objective of the present invention is to provide a one-pot process of synthesizing silver-containing waterborne polyurethane, in which a silver ion-containing solution is directly added into a waterborne polyurethane emulsion through one-pot method so as to form a stable silver-containing waterborne polyurethane emulsion.

Another objective of the present invention is to provide a one-pot process of synthesizing silver-containing waterborne polyurethane, from which a product can be prepared with excellent antibacterial, bactericidal and deodorant effects but using a small amount of silver.

Still another objective of the present invention is to provide a one-pot process of synthesizing silver-containing waterborne polyurethane, from which a film can be formed with good thermal property and mechanical properties.

To achieve the aforementioned objectives, the one-pot s process of synthesizing silver-containing waterborne polyurethane provided by the present invention includes the step of adding stirring silver ion-containing solution into waterborne polyurethane emulsion with active stirring to form a stable silver-containing waterborne polyurethane emulsion.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIGS. 5A and 5B are diagrams showing particle size variations of waterborne polyurethane micelles contained in the emulsion prepared according to the preferred embodiment of the present invention;

FIG. 6 is a TGA analysis diagram of the film formed by the emulsion prepared according to the preferred embodiment of the present invention;

DETAILED DESCRIPTION OF THE INVENTION

A one-pot process of synthesizing silver-containing waterborne polyurethane (hereinafter referred to as "WBPU") provided by a preferred embodiment of the present invention includes the step of adding with active stirring silver nitrate ($AgNO_3$) solution into WBPU emulsion with a solid content of 30%. The weight of the silver nitrate is 0.1% of that of the WBPU emulsion having a solid content of 30%. A stable silver-containing WBPU emulsion can be obtained after well stirring. When the WBPU emulsion is visually observed after addition of silver nitrate, the resulting solution shows a light brown color without aggregation or precipitation phenomenon, exhibiting that the stability of the silver-containing WBPU emulsion prepared in accordance with the method of the present invention is excellent. It is known that the conventional WBPU emulsion without addition of silver nitrate solution shows a milky color. In addition, while the amount of the silver nitrate is increased to 0.33% of the weight of the WBPU emulsion, the color of the resulted WBPU emulsion will be relatively darkened.

Because of the presence of hydrophilic groups in WBPU, the resultant product is presented in emulsion form when WBPU are dispersed in water. In addition, WBPU micelles can hardly aggregate together due to the surface electric charges thereof; therefore, silver nitrate solution and WBPU emulsion can be mixed well while silver nitrate solution is added to WBPU emulsion. Furthermore, because the silver ions contained in the silver nitrate solution tend to be attracted by the WBPU's surface electric charges provided by the functional groups, such as amide group, urethane group, urea group, ester group, ether group, acid group or hydroxyl group, or to be pseudo-chelated by the WBPU's hydrophilic group, such as ester group, ether group, acid group or hydroxyl group. As a result, silver particles can be dispersed uniformly in the WBPU emulsion when the silver ions are reduced to metallic silver.

Figure 1:
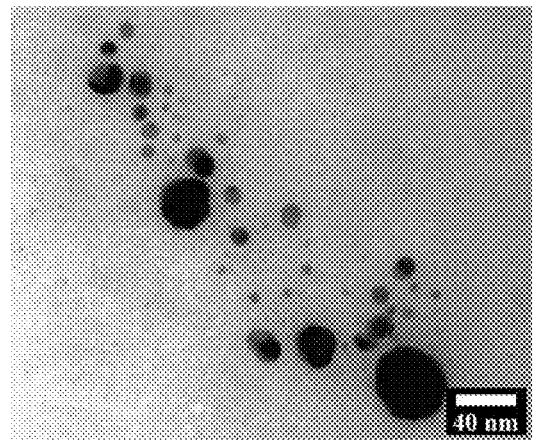
FIG. 1 is a transmission electron microscopy image of conventional nano-scaled silver particles.
Figure 2:
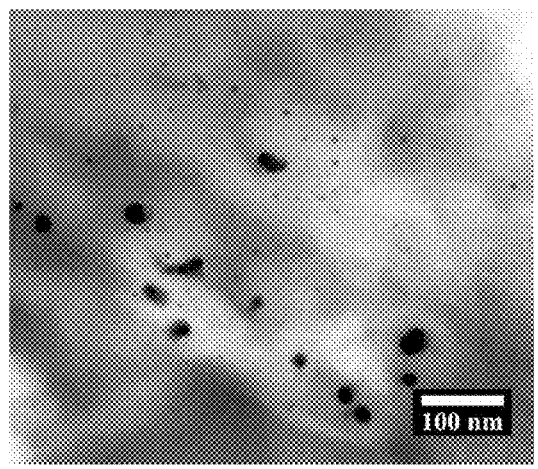
FIG. 2 is a transmission electron microscopy image of conventional silver-containing waterborne polyurethane.
Figure 3:
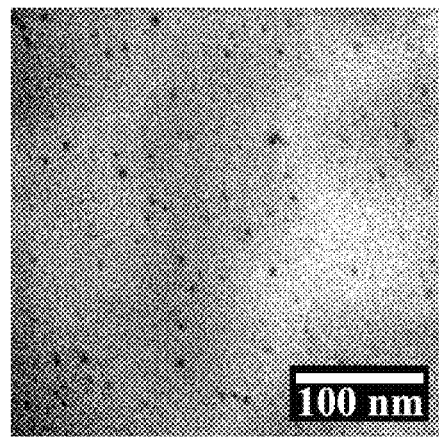
FIG. 3 is a transmission electron microscopy image of a film formed by the emulsion prepared according to a preferred embodiment of the present invention.

FIG. 3 is a transmission electron microscope image of a film obtained by coating and drying the silver-containing WBPU emulsion prepared according to the method of the present invention. As shown in FIG. 3, the well dispersed silver particles have a uniform particle size of about 6-8 nm, which can be classified as nano-scaled particles.

Figure 4:
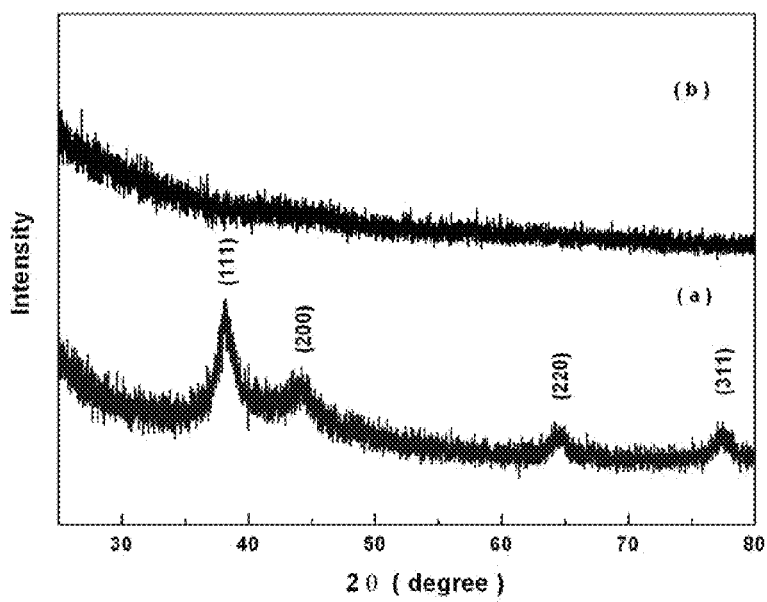
FIG. 4 is an X-ray diffraction diagram of the film formed by the emulsion prepared according to the preferred embodiment of the present invention.

Referring to FIG. 4, it clearly shows that the particles contained in WBPU film are indeed metallic silver by X-ray diffraction analysis. In FIG. 4, the curve (a) is the analysis result of a WBPU film formed by a WBPU emulsion in which the amount of silver nitrate is 1 weight % of the WBPU emulsion. The curve (a) shows four diffraction peaks at diffraction angles of 38.4°, 44.2°, 64.4° and 77.6°. The four diffraction peaks are compared to JCPDS card to confirm that the four diffraction peaks correspond to the diffraction peaks of (111), (200), (220) and (311) crystal planes of silver atom respectively. Thus, it is confirmed that the silver ions contained in silver nitrate solution have been reduced to metallic silver after the silver nitrate solution and WBPU emulsion being mixed together. Contrarily, the curve (b) in FIG. 4 is the analysis result of pristine WBPU film. The curve (b) shows no diffraction peaks.

A further experimental result showed that WBPU micelles are uniformly dispersed and are existing in emulsion form when a small amount of silver nitrate solution, e.g. the amount of silver nitrate is 0.1 weight % of WBPU emulsion, was added to WBPU emulsion, as shown in FIG. 5A. In addition, when the amount of silver nitrate increases, e.g. the amount of silver nitrate is 0.33 weight % of WBPU emulsion, the obtained emulsion is still stable and exhibits good dispersion. FIG. 5 and FIG. 5B shows the result of the final particle sizes of WBPU micelles contained in the emulsion after a long-time storage. The particle sizes are stable and maintain at about 120 nm after 45-day storage; therefore, it is a proof that the stability of the emulsion prepared according to the method in the present invention is excellent.

A uniform transparent thin film with a straw-yellow color can be obtained by coating the silver-containing WBPU emulsion on a surface of a substrate at room temperature and then drying or dehydrating the coated substrate. As the amount of silver nitrate increases, the color of the thin film gradually becomes darker, but the 20 transparency thereof is still maintained. The film formed by a silver-containing WBPU emulsion, in which the amount of silver nitrate is 0.1 weight % of the WBPU emulsion, shows a light tan color, and the film formed by a silver-containing WBPU emulsion, in which the amount of silver nitrate is 0.33 weight % of the WBPU emulsion, shows a tan color.

As the amount of silver nitrate solution exceeds a certain level, the charge-balance on the surface of WBPU micelles are upset, thereby causing the micelles to aggregate and precipitate, such that a uniform WBPU film cannot be formed.

In order to learn the thermal property of silver-containing WBPU film, a TGA analysis was conducted. As shown in FIG. 6, the thermal decomposition temperature (Td) of the pristine WBPU film is about 252° C., and the Td of silver-containing WBPU film increases to 259° C. while the amount of silver nitrate increases to 0.33 weight % of WBPU emulsion.

Figure 7:
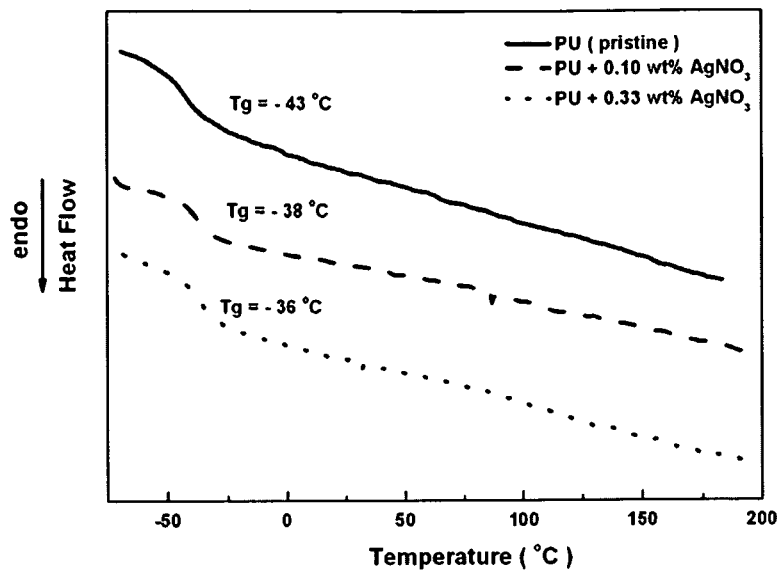
FIG. 7 is a DSC analysis diagram of the film formed by the emulsion prepared according to the preferred embodiment of the present invention.

FIG. 7 shows an analysis result of glass transition temperature of the silver-containing WBPU film. According to DSC analysis, the (Tg) of the pristine WBPU film is about −43° C., and the Tg of silver-containing WBPU film increases to −36° C. while the amount of silver nitrate increases to 0.33 weight % of WBPU emulsion.

Figure 8:
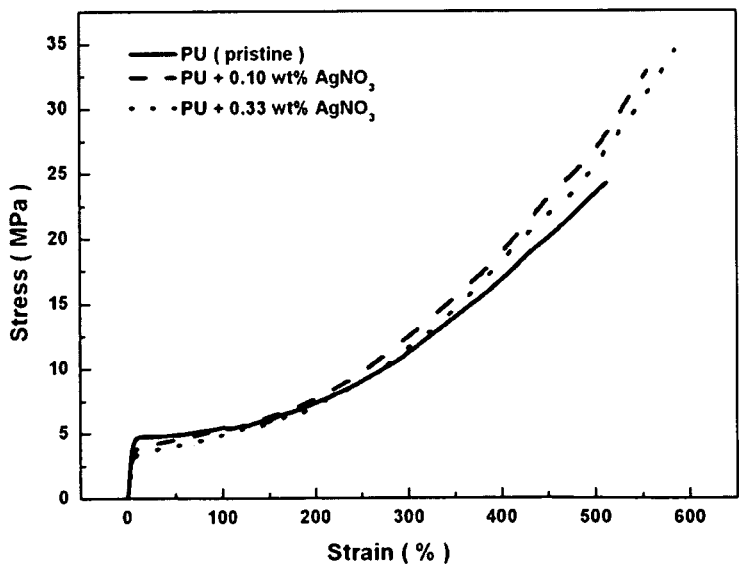
FIG. 8 is a plot illustrating tensile test results of the film formed by the emulsion prepared according to the preferred embodiment of the present invention.

FIG. 8 shows the tensile test results of silver-containing WBPU film. Compared to the pristine WBPU film, the tensile strength of the silver-containing WBPU film is improved.

Figure 9:
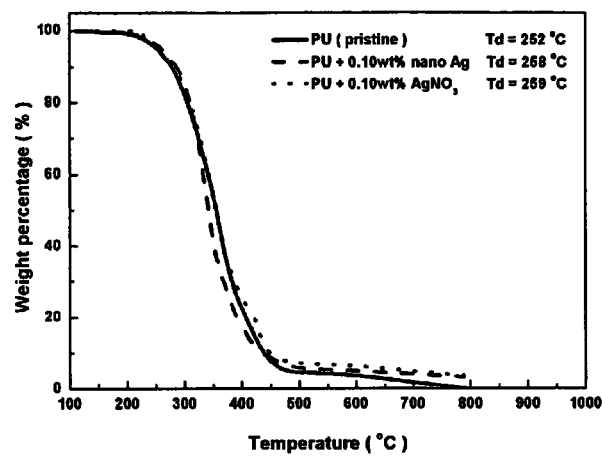
FIG. 9 is a TGA analysis diagram of the films formed by the emulsion prepared according to the preferred embodiment of the present invention and a conventional nano-scaled silver ion-containing waterborne polyurethane emulsion respectively.
Figure 10:
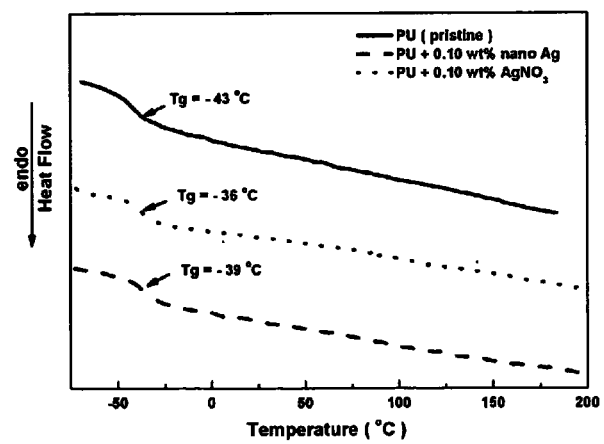
FIG. 10 is a DSC analysis diagram of the films formed by the emulsion prepared according to the preferred embodiment of the present invention and the conventional nano-scaled silver ion-containing waterborne polyurethane emulsion respectively.
Figure 11:
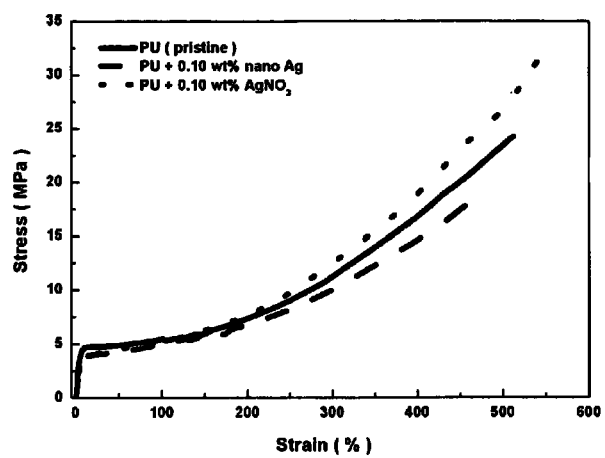
FIG. 11 is a plot illustrating tensile test results of the films formed by the emulsion prepared according to the preferred embodiment of the present invention and the conventional nano-scaled silver ion-containing waterborne polyurethane emulsion respectively.

Referring to FIGS. 9 and 10, when the silver-containing WBPU film prepared according to the present method is compared to silver-containing WBPU film prepared by a conventional method, i.e. by blending nano-scaled silver particles with 20 WBPU emulsion and then drying the resultant, it can be found that there is no apparent difference in thermal properties between these two silver-containing WBPU films; however, as shown in FIG. 11, the mechanical properties therebetween have an apparent difference. The tensile strength of the silver-containing WBPU film prepared according to the present method is improved compared to that of the pristine WBPU film, but the tensile strength of the silver-containing WBPU film prepared by the conventional method is decreased as compared to that of the pristine WBPU film. Therefore, the mechanical property of the film prepared by the present method is indeed better than that of the film prepared by the conventional method.

Figure 12A:
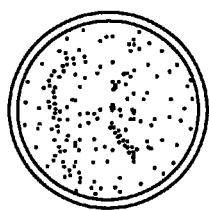
FIGS. 12A to 12D are photographs showing antibacterial test results of the film formed by the emulsion prepared according to the preferred embodiment of the present invention.
Figure 12B:
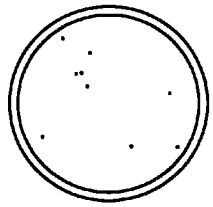
Figure 12C:
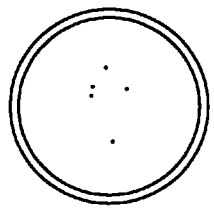
Figure 12D:
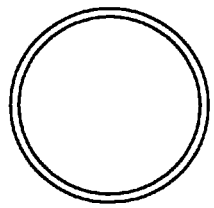

The antibacterial property of the film formed by the silver-containing WBPU emulsion prepared by the present method was evaluated under standard JIS Z 2801 method, in which *Staphylococcus aureus* ATCC6538P was used. The results are shown in FIGS. 12A to 12D, wherein FIG. 12A shows the result of a comparative example that is a polyurethane film containing no silver. After 24 hours, the surface of the film without containing silver was covered with *Staphylococcus aureus*, as shown in FIG. 12A. FIG. 12B shows that the amount of *Staphylococcus aureus* decreases apparently on the surface of the polyurethane film formed by the silver-containing WBPU emulsion in which the amount of silver nitrate is 0.01 weight % of WBPU. FIG. 12C shows the result of the polyurethane film formed by the silver-containing WBPU emulsion in which the amount of silver nitrate is 0.1 weight % of WBPU. FIG. 12D shows the result of the polyurethane film formed by the silver-containing WBPU emulsion in which the amount of silver nitrate is 0.33 weight % of WBPU. As shown in FIG. 12D, the amount of *Staphylococcus aureus* is reduced to a minimum extent as compared to the results shown in FIGS. 12B and 12C. Thus, it can be concluded that adding a small amount of silver nitrate solution to 20 WBPU emulsion can achieve an excellent antibacterial effect.

In order to accelerate the reduction of silver ions, the present method may further include the step of simultaneously adding a reducing agent, such as sodium borohydride ($NaBH_4$) solution along with silver ion-containing solution, into WBPU emulsion. The reduction reaction of the resultant emulsion can be rapidly completed under stirring, and the film formed therefrom is nearly red, but still transparent.

As stated above, through the silver-containing WBPU emulsion prepared according to the method of the present invention can stand for a long time, without the WBPU micelles aggregating or precipitating. Besides, the silver particles contained in the WBPU emulsion have a uniform size and can be well dispersed in the emulsion. Furthermore, the film formed by coating and drying the silver-containing WBPU emulsion of the present invention has good transparency, thermal property and mechanical strength compared to the pristine product prepared by the conventional method, and exhibits excellent antibacterial, bactericidal and deodorant effect in presence of a small amount of silver.

On the basis of the spirit of the present invention, all of the parameters of the one-pot process of synthesizing silver-containing WBPU can be changed, if necessary. For example, the solute of the silver ion-containing solution may be any other silver salt compound as long as it has the same effect as silver nitrate. Preferably, the silver salt compound may be silver fluoride (AgF), silver chloride (AgCl), silver bromide (AgBr) or silver iodide (AgI). In addition, the solvent of the silver ion-containing solution may be, but not limited to, water, dimethyl sulfoxide, dimethyl formamide, ethylene glycol, methanol, ethanol, n-propanol, isopropanol, n-butanol, isobutanol, 2-butanol, 3-butanol, acetone, methyl ethyl ketone, tetrahydrofuran or pyridine. For the reducing agent, lithium aluminum hydride ($LiAlH_4$) solution or hydrazine ($H_2NNH_2$) solution can be used in addition to the sodium borohydride (NaBH) solution.

Silver nitrate or the solute of silver ion-containing solution may have a weight greater than zero and less than 3.3 weight % of the WBPU emulsion, and preferably greater than 3 ppm and less than 1.5 weight % of the WBPU emulsion. Besides, silver nitrate or the solute of silver ion-containing solution may have a weight greater than zero and less than 10 weight % of the solid content of the WBPU emulsion; and more preferably greater than 10 ppm and less than 5 weight % of the solid content of the WBPU emulsion. In addition, the WBPU emulsion may have a solid content of greater than zero and less than 40%, and more preferably greater than 20% and less than 35%. Furthermore, the reducing agent may have a concentration greater than zero and less than 1M, and may have a weight greater than zero and less than 0.33 weight % of the solid content of the WBPU emulsion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A one-pot process of synthesizing waterborne polyurethane containing nano-scaled silver particles, consisting of the following steps:
    (a) adding a silver ion-containing solution into a waterborne polyurethane emulsion;
    (b) stirring the mixture of waterborne polyurethane and silver ion-containing solution to distribute the silver ions through the emulsion whereby the silver ions are reduced to metallic silver, thereby forming nano-scaled silver particles throughout the waterborne polyurethane emulsion.

2. The one-pot process according to claim 1, wherein a solute of said silver ion-containing solution is selected from the group consisting of silver nitrate, silver fluoride, silver chloride, silver bromide and silver iodide.

3. The one-pot process according to claim 1, wherein a solvent of said silver ion-containing solution is selected from the group consisting of water, dimethyl sulfoxide, dimethyl formamide, ethylene glycol, methanol, ethanol, n-propanol, isopropanol, n-butanol, isobutanol, 2-butanol, 3-butanol, acetone, methyl ethyl ketone, tetrahydrofuran and pyridine.

4. The one-pot process according to claim 1, wherein a solute of said silver ion-containing solution has a weight greater than zero and less than 3.3 weight % of said waterborne polyurethane emulsion.

5. The one-pot process according to claim 4, wherein the solute of said silver ion-containing solution has a weight greater than 3 ppm and less than 1.5 weight % of said waterborne polyurethane emulsion.

6. The one-pot process according to claim 1, wherein said waterborne polyurethane emulsion has a solid content greater than zero and less than 40%.

7. The one-pot process according to claim 6, wherein the solid content of said waterborne polyurethane is greater than 20% and less than 35%.

8. A one-pot process of synthesizing waterborne polyurethane containing nano-scaled silver particles, consisting of the following steps:
    (a) adding a silver ion-containing solution into a waterborne polyurethane emulsion;

(b) stirring the mixture of waterborne polyurethane and silver ion-containing solution to distribute the silver ions through the emulsion whereby the silver ions are reduced to metallic silver, thereby forming nano-scaled silver particles throughout the waterborne polyurethane and (c) drying the waterborne polyurethane emulsion in which said silver ion-containing solution is added to form a waterborne polyurethane containing nano-scaled silver particles.

9. The one-pot process according to claim 1, wherein a solute of said silver ion-containing solution has a weight greater than zero and less than 10 weight % of a solid content of said waterborne polyurethane emulsion.

10. The one-pot process according to claim 9, wherein the solute of said silver ion-containing solution has a weight greater than 10 ppm and less than 5 weight % of the solid content of said waterborne polyurethane emulsion.

11. A one-pot process of synthesizing waterborne polyurethane containing nano-scaled silver particles, consisting of the step of adding a waterborne polyurethane emulsion into a silver ion-containing solution with stirring thereby reducing the silver ions to form a waterborne polyurethane containing nano-scaled silver particles.

* * * * *